(12) United States Patent
Scherer et al.

(10) Patent No.: US 9,051,868 B2
(45) Date of Patent: Jun. 9, 2015

(54) METHOD AND DEVICE FOR MONITORING A NITROGEN OXIDE STORAGE CATALYTIC CONVERTER

(71) Applicant: Robert Bosch GmbH, Stuttgart (DE)

(72) Inventors: Stefan Scherer, Stuttgart (DE); Tobias Pfister, Stuttgart (DE); Herbert Schoemig, Stuttgart (DE); Holger Ziegler, Niefern-Oeschellbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/195,193

(22) Filed: Mar. 3, 2014

(65) Prior Publication Data

US 2014/0245822 A1 Sep. 4, 2014

(30) Foreign Application Priority Data

Mar. 1, 2013 (DE) .......................... 10 2013 203 495

(51) Int. Cl.
*F01N 11/00* (2006.01)

(52) U.S. Cl.
CPC . *F01N 11/00* (2013.01); *Y02T 10/47* (2013.01)

(58) Field of Classification Search
CPC ..... Y02T 10/47; F01N 11/00; F01N 2250/02; F01N 2560/02; F01N 3/0842
USPC ..................................................... 73/114.75
See application file for complete search history.

(56) References Cited

U.S. PATENT DOCUMENTS

| | | | | |
|---|---|---|---|---|
| 6,279,372 | B1 * | 8/2001 | Zhang | 73/1.07 |
| 6,601,381 | B2 * | 8/2003 | Mussmann et al. | 60/274 |
| 6,684,628 | B2 * | 2/2004 | Gobel et al. | 60/277 |
| 7,926,333 | B2 * | 4/2011 | Odendall | 73/114.75 |
| 8,225,649 | B2 * | 7/2012 | Odendall et al. | 73/114.75 |
| 8,230,674 | B2 * | 7/2012 | Bremm et al. | 60/276 |
| 8,457,927 | B2 * | 6/2013 | Odendall | 702/183 |
| 8,522,608 | B2 * | 9/2013 | Odendall | 73/114.75 |
| 2012/0031075 | A1 * | 2/2012 | Odendall | 60/274 |

FOREIGN PATENT DOCUMENTS

WO 2006069652 7/2006

* cited by examiner

*Primary Examiner* — Freddie Kirkland III
(74) *Attorney, Agent, or Firm* — Michael Best & Friedrich LLP

(57) ABSTRACT

A method for monitoring a nitrogen oxide storage catalytic converter (NSC) in the exhaust gas duct of an internal combustion engine which is operated at least temporarily in a lean fashion, wherein during a lean mode of the internal combustion engine nitrogen oxides from the exhaust gas are stored by the nitrogen oxide storage catalytic converter, wherein during a regeneration phase of the nitrogen oxide storage catalytic converter the internal combustion engine is operated in a rich fashion, and as a result the nitrogen oxides stored in the nitrogen oxide storage catalytic converter are removed, and wherein an exhaust gas component or exhaust gas characteristic variable which is characteristic of the profile of the regeneration is detected during the regeneration phase by means of an exhaust gas probe.

13 Claims, 4 Drawing Sheets

METHOD AND DEVICE FOR MONITORING A NITROGEN OXIDE STORAGE CATALYTIC CONVERTER

BACKGROUND OF THE INVENTION

The invention relates to a method for monitoring a nitrogen oxide storage catalytic converter (NSC) in the exhaust gas duct of an internal combustion engine which is operated at least temporarily in a lean fashion, wherein during a lean mode of the internal combustion engine nitrogen oxides from the exhaust gas are stored by the nitrogen oxide storage catalytic converter, wherein during a regeneration phase of the nitrogen oxide storage catalytic converter the internal combustion engine is operated in a rich fashion, and as a result the nitrogen oxides stored in the nitrogen oxide storage catalytic converter are removed, and wherein an exhaust gas component or exhaust gas characteristic variable which is characteristic of the profile of the regeneration is detected during the regeneration phase by means of an exhaust gas probe.

The invention also relates to a device, in particular a diagnostic unit, for carrying out the method according to the invention.

In order to reduce fuel consumption, what are referred to as lean engines have been developed in the field of petrol engines, said lean engines being operated with a lean air/fuel mixture in the partial load mode. This mixture contains a comparatively higher oxygen concentration than is required for the complete combustion of the fuel. The oxidizing components, such as oxygen ($O_2$) and/or nitrogen oxides ($NO_x$), are then present in excess in the exhaust gas compared to the reduced exhaust gas components such as carbon monoxide (CO), hydrogen ($H_2$) and/or hydrocarbons ($H_2$). In contrast, diesel engines generally operate under operating conditions with widely superstoichiometric air/fuel mixtures.

In order to be able to reduce the nitrogen oxide emissions of internal combustion engines which are operated in a lean fashion it is known to provide $NO_x$ storage catalytic converters (Nitrogen Oxygen Storage Catalyst—NSC) in the exhaust gas ducts. An $NO_x$ storage catalytic converter stores nitrogen oxides from the exhaust gas, while the internal combustion engine is operated with an excess of air, that is to say a superstoichiometric air/fuel ratio with a lambda value >1.

In order to maintain the storage capability of the $NO_x$ storage catalytic converter, the stored nitrogen oxide has to be removed from time to time. In order to carry out such a regeneration of the $NO_x$ storage catalytic converter it is known to establish a reducing exhaust gas atmosphere in which the stored nitrogen oxide is converted into nitrogen. For this purpose, the internal combustion engine is operated in a rich fashion that is to say with a substoichiometric air/fuel ratio with a lambda value <1. After such regeneration, the NSC can absorb nitrogen oxides again.

The currently valid regulations for on-board diagnosis (OBD) in Europe and in the USA require nitrogen oxide storage catalytic converters to be monitored in terms of their emission-reducing effect on nitrogen oxides ($NO_x$).

EP 1 831 509 B1 discloses a method for monitoring the nitrogen oxide storage capability of a nitrogen oxide storage catalytic converter, used as a starting catalytic converter, in an exhaust gas purification system of a motor vehicle with a lean engine, which exhaust gas purification system contains a catalytic converter system composed of the starting catalytic converter and a main catalytic converter which is also embodied as a nitrogen oxide storage catalytic converter. In this context, in a normal operating mode of the catalytic converter system, when the evaluation of nitrogen oxide slip downstream of the main catalytic converter system exceeds a regeneration criterion, in each case total regeneration of the catalytic converter system is performed by briefly switching over the engine from lean mode to rich mode. In this context it is provided that in order to check the nitrogen oxide storage capability of the starting catalytic converter the entire catalytic converter system is loaded with nitrogen oxides until the regeneration criterion is reached, and partial regeneration, which comprises regeneration of only the starting catalytic converter, of the catalytic converter system is performed. For this purpose, rich mode is ended and the system is switched back into the lean mode if a breakthrough of rich exhaust gas is registered between the starting catalytic converter and the main catalytic converter, and for which purpose the time period after the switching back into the lean mode until the regeneration criterion is exceeded again is measured downstream of the catalytic converter system as a measure of the nitrogen oxide storage capability of the starting catalytic converter.

A robust OBD means here, in particular, that a monitoring function has to be made available which can differentiate an intact NSC, referred to as a WPA ("worst part acceptable") model in terms of legislation, from a defective NSC, referred to as a BPU ("best part unacceptable") model in terms of legislation.

Damage to the NSC brings about, for example, a decrease in the consumption of reducing agent during a complete regeneration. This variable is accessible by means of two lambda probes, which are installed upstream and downstream of the NSC, with the result that it can be used as a monitoring feature for diagnosis of the NSC. In particular precise determination of the lambda values by means of the two exhaust gas probes are essential in terms of the robustness and sensitivity of the method for monitoring the consumption of reducing agent.

In order to achieve better separation between the BPU ("best part unacceptable") and WPA ("worst part acceptable"), in particular plausibility-checking functions are carried out only under certain monitoring conditions.

In the field of exhaust gas post-treatment, monitoring operations for this purpose are frequently limited to specific value ranges for one or more of the following variables, on a modeled or measured basis. These variables may be, for example, the exhaust gas mass flow, the exhaust gas volume, the exhaust gas temperature at any desired location, the operating point (rotational speed, injection quantity), the vehicle speed, the ambient pressure, the ambient temperature, the signal values for, for example, the oxygen content, nitrogen oxide content, hydrocarbon content or carbon monoxide content, the exhaust gas recirculation rate (EGR), the engine operating mode, the engine status, the engine running time and/or the engine service life.

Furthermore, for the same reason, monitoring operations are frequently carried out under (quasi-) steady-state conditions which are determined on the basis of one or more of the abovementioned variables.

SUMMARY OF THE INVENTION

The object of the invention is to make available a robust monitoring method for nitrogen oxide storage catalytic converters.

The object of the invention is also to make available a corresponding device for carrying out the method according to the invention.

The object of the invention which relates to the method is achieved in that, with a change in a chronologically variable lambda profile upstream of the nitrogen oxide storage catalytic converter in the range $\lambda<1$, changes in a lambda gradient profile downstream of the nitrogen oxide storage catalytic converter (NSC) or variables derived therefrom are evaluated as a feature for monitoring the nitrogen oxide storage catalytic converter and on the basis of these values a diagnosis of the storage capability for nitrogen oxides of the nitrogen oxide storage catalytic converter is carried out. In this context, the ability of the NSC to filter out changes (gradients) in the lambda value upstream of the NSC in the rich range ($\lambda<1$) is evaluated, with the result that the lambda signal downstream of the NSC indicates only slight changes (gradient). In the case of a damaged NSC, the ability to attenuate gradients is reduced, with the result that increased lambda gradients occur downstream of the NSC. The method permits wide-ranging decoupling of the monitoring feature of absolute lambda values. The absolute value tolerances of the exhaust gas probes which are embodied as lambda probes do not have any influence, or only a small influence, on the monitoring feature. This permits a robust monitoring method for the nitrogen oxide storage catalytic converter.

This lambda gradient profile downstream of the NSC can be used as basis for a new monitoring feature. Since basically positive and negative gradients are suitable to the same extent for evaluation, in the same way as this provides a preferred method variant, the absolute value of the lambda gradient profile downstream of the nitrogen oxide storage catalytic converter or a squared lambda gradient profile can be used for diagnosis. Since changes in sign are eliminated with this, subsequent evaluation steps can be simplified.

In order to eliminate disruptive high-frequency fluctuations in the lambda signal, the use of filters, for example of a PT-1 filter, usually proves advantageous both for the lambda raw signal and for the lambda gradient which is determined. Therefore, a further method variant provides that the lambda gradient profile downstream of the nitrogen oxide storage catalytic converter is smoothed over time by means of a filter function.

A reliable diagnosis of a defective or still intact nitrogen oxide storage catalytic converter can be implemented if a gradient feature value is calculated by integrating the squared lambda gradient profile, and a final value of the gradient feature value is compared with a fault threshold at the end of a monitoring time period, and a defective or intact nitrogen oxide storage catalytic converter is detected on the basis of the result. In this context it is possible to provide that the integration period corresponds to the monitoring time period. In particular, as a result a robust on-board diagnosis (OBD) can be implemented and therefore a monitoring function can be made available which can reliably differentiate an intact NSC, what is referred to as a WPA ("worst part acceptable") model in terms of legislation, from a defective NSC, what is referred to as a BPU ("best part unacceptable") model in terms of legislation.

In one preferred method variant there is provision here that the fault threshold is applied as a function of ambient conditions for the nitrogen oxide storage catalytic converter (for example catalytic converter temperature, exhaust gas mass flow) and/or operating states of the internal combustion engine. This adaptive fault threshold permits more precise detection of nitrogen oxide storage catalytic converters which are no longer acceptable.

The gradient monitoring starts with the lambda dynamic excitation upstream of the NSC. This means that a lambda profile which changes over time has to be generated in the rich region, i.e. $\lambda<1$. For this purpose, a simple transition from the lean range into the rich range can be used for example. This can be achieved by correspondingly switching over the engine application. Such switching over into the rich mode takes place, for example, when the NSC regeneration mode starts. In this context, a high negative lambda value, which can be used as a lambda dynamic excitation for the gradient monitoring, is obtained on the inlet side of the catalytic converter. As an alternative to evaluating the lean/rich jump at the start of an NSC regeneration, it is also possible to use the rich/lean jump at the end of an NSC regeneration. Apart from these passive approaches to using already given lambda rich gradients, it is also possible to generate such lambda gradients explicitly for the purpose of monitoring by active measures. Therefore, in the case of the monitoring method according to the invention there is provision that the diagnosis is started when a lambda rich dynamic is detected or with the activation of a suitable engine mode in order to make available an exciting lambda rich dynamic.

The value for the lambda gradient profile downstream of the NSC can alternatively be calculated by forming ratios with the corresponding value for the lambda gradient profile upstream of the NSC to form a gradient ratio. There is therefore provision that an excitation-side lambda value or lambda gradient value is determined by means of an exhaust gas probe, configured as a lambda probe, upstream of the nitrogen oxide storage catalytic converter in the direction of flow of the exhaust gas, and the lambda gradient profile downstream of the nitrogen oxide storage catalytic converter is standardized. As a result, variations or faults in the excitation-side lambda gradients can be taken into account better and compensated during the diagnosis.

In another method variant, an alternative to the above, it is possible to provide that the excitation-side lambda value or lambda gradient value is determined on a model basis. As a result, the expenditure on hardware application can be reduced. Such model values can be stored in characteristic diagram memories as a function of the operating phase or can be calculated on the basis of engine parameters which are determined in a superordinate engine controller and/or stored there.

A preferred monitoring function provides that the monitoring or diagnosis of the nitrogen oxide storage catalytic converter is carried out in a plurality of steps, wherein in a first step the diagnosis is started after the detection of a dynamic lambda excitation, in a second step the gradient feature value is calculated, in a third step it is checked whether certain robustness conditions are met, in a fourth step it is checked whether the gradient feature value undershoots the fault threshold, and when these conditions are met an intact nitrogen oxide storage catalytic converter is detected, and when the fault threshold is exceeded a defective nitrogen oxide storage catalytic converter is detected and the diagnostic phase is ended, wherein when the robustness conditions are not met the diagnosis is aborted and repeated at a later time. The checking of the robustness condition has the advantage that on the basis of the result it can be evaluated whether the quality of the diagnosis result is sufficiently high and the diagnosis has to be prematurely aborted in order to avoid incorrect diagnoses. For example the thermal state of the NSC or the quality of the lambda rich dynamic can be used as robustness conditions.

The object of the invention which relates to the device is achieved in that the diagnostic unit has devices for carrying out the monitoring method according to the method features described above, such as comparators, characteristic diagram memories and calculation units for calculating a gradient feature value from a lambda gradient profile downstream of the nitrogen oxide storage catalytic converter. The functionality of the monitoring method can be implemented by software in the diagnostic unit here. The diagnostic unit can be embodied as a standalone unit or can be an integral component of a superordinate engine controller, wherein the diagnostic result can be stored in a fault memory of the engine controller and/or the engine monitoring light can be switched on when a defective NSC is detected.

In one preferred device variant there is provision that the exhaust gas probe is arranged downstream of the nitrogen oxide storage catalytic converter in the exhaust gas duct and is embodied as a lambda probe. With respect to the standardization of the lambda gradient profile downstream of the NSC as described above it is optionally possible to provide that a further exhaust gas probe, embodied as a lambda probe, is provided upstream of the nitrogen oxide storage catalytic converter, the signals of which exhaust gas probe can be evaluated by the diagnostic unit. Basically, other sensors with which an oxygen content in the exhaust gas can be determined can also be used.

BRIEF DESCRIPTION OF THE DRAWINGS

The invention will be explained in more detail below with reference to an exemplary embodiment which is illustrated in the figures. In the drawing.

DETAILED DESCRIPTION

Figure 1:
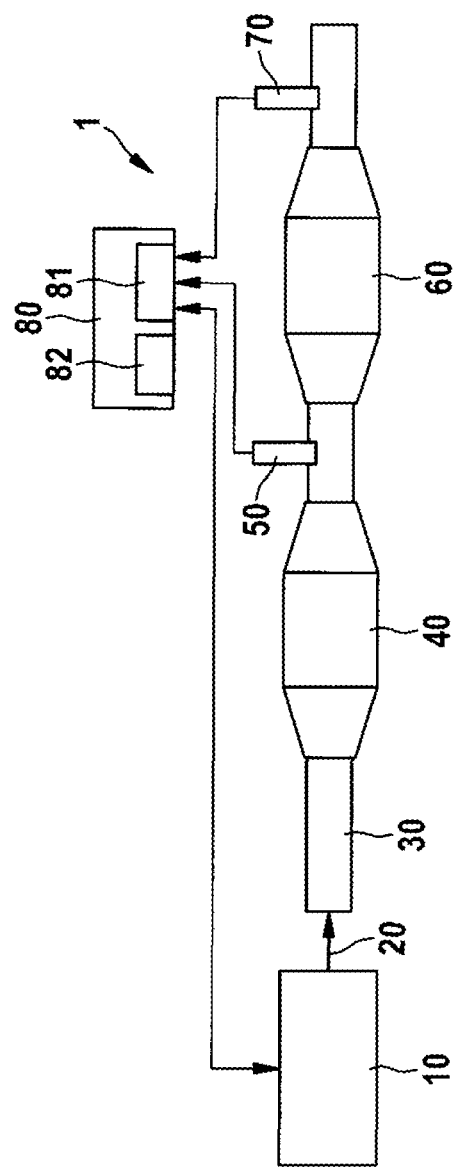
FIG. 1 shows the technical field of the method according to the invention using an example.

FIG. 1 shows as example the technical field in which the method according to the invention can be applied. An internal combustion engine 1 which is embodied as a diesel engine is schematically illustrated, wherein an exhaust gas flow 20 is conducted from the engine block 10 into an exhaust gas duct 30 to an exhaust gas purification system. The exhaust gas purification system is composed in the example shown of a diesel particle filter (DPF) 40 and a nitrogen oxide storage catalytic converter 60 (NSC) which is connected downstream in the direction of flow of the exhaust gas.

In the example shown, the lambda value upstream and downstream of the nitrogen oxide storage catalytic converter 60 is determined with an exhaust gas probe 50, embodied as a lambda probe, upstream of the nitrogen oxide storage catalytic converter 60, and an exhaust gas probe 70 which is connected downstream of the latter and is also embodied as a lambda probe, and the signal is fed to a diagnostic unit 81 which can be embodied as an integral component of a superordinate engine controller 80. The signals of the exhaust gas probes 50, 70 are evaluated in the diagnostic unit 81. In the case of a malfunction or during the diagnosis of a faulty nitrogen oxide storage catalytic converter 60, corresponding entries are made in a fault memory 82 of the engine controller 80. Further components such as, for example, further exhaust gas probes for determining $NO_x$ or else particle sensors are not illustrated in FIG. 1.

A similar design can also be found, for example, with a lean engine which is embodied as a petrol engine and in which a nitrogen oxide storage catalytic converter 60 (NSC) is provided for reducing the nitrogen oxide content. Instead of the diesel particle filter (DPF) 40 it is possible to provide other components for the exhaust gas purification.

Figure 2:
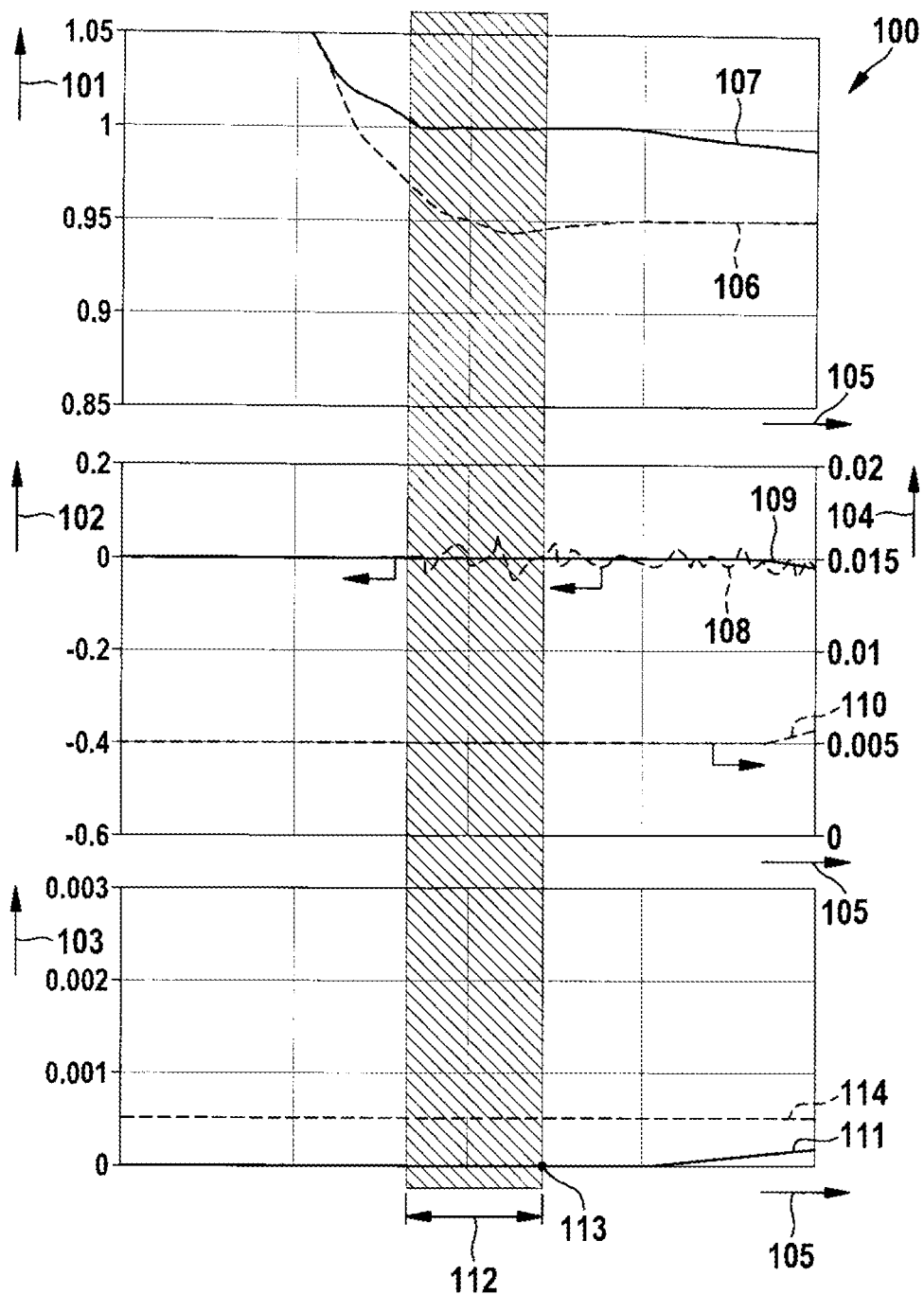
FIG. 2 shows a signal profile diagram of an intact nitrogen oxide storage catalytic converter.
Figure 3:
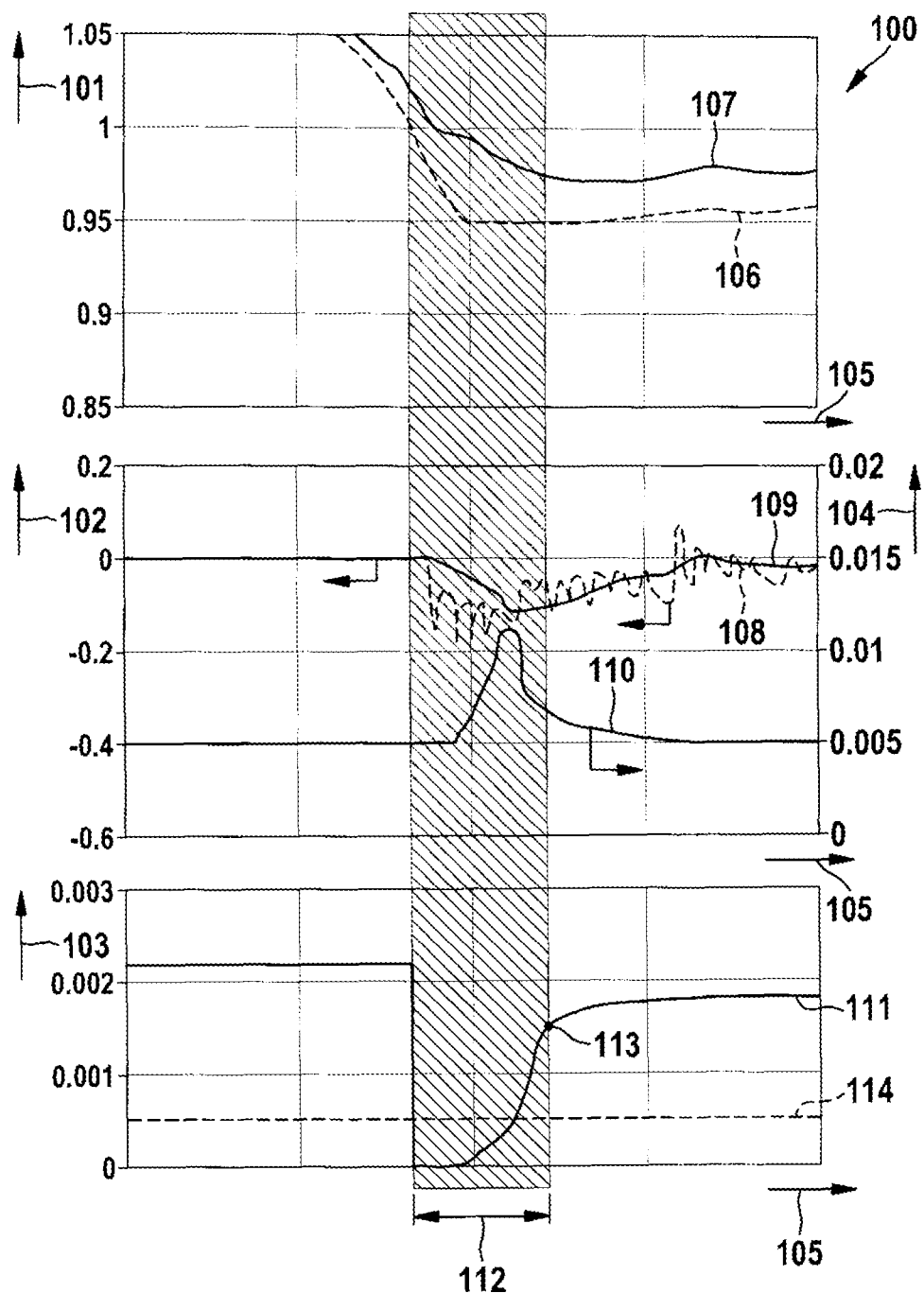
FIG. 3 shows a signal profile diagram of a defective nitrogen oxide storage catalytic converter.

The diagnostic method according to the invention for detecting a defective nitrogen oxide storage catalytic converter 60 is explained on the basis of signal profile diagrams 100 illustrated in FIGS. 2 and 3, wherein FIG. 2 shows the signal profile for an intact nitrogen oxide storage catalytic converter 60, and FIG. 3 shows the signal profile for a defective nitrogen oxide storage catalytic converter 60.

It is based on the evaluation of lambda gradients wherein in a minimal design the presence of a lambda probe downstream of the NSC (exhaust gas probe 70 in FIG. 1) is provided. This probe supplies, correspondingly derived over time, the lambda gradient downstream of the NSC as a decisive input variable for determining the monitoring feature.

A further lambda probe upstream of the NSC (exhaust gas probe 50 in FIG. 1) is optional and advantageous in order to be able to determine the lambda values and gradients on the excitation side. Said values and gradients can be used to standardize the lambda gradient downstream of the NSC or else in order to evaluate the suitability of the excitation-side lambda gradients (robustness criterion). The standardization can take place here by forming ratios with the lambda gradient upstream of the NSC. Alternatively, the signal of the lambda probe upstream of the NSC can also be replaced by a model value which can be stored, on the basis of engine parameters for different operating phases of the internal combustion engine 1, in the diagnostic unit 81 or in the engine controller 80 in the form of characteristic diagrams.

In both figures, a lambda value 101 as a function of the time 105 is illustrated in the upper part of the signal profile diagram 100. A lambda profile upstream of the NSC 106 (dashed line) describes the time profile of the output signal of the exhaust gas probe 50 upstream of the nitrogen oxide storage catalytic converter 60. A lambda profile downstream of the NSC 107 (unbroken line) describes the time profile of the output signal of the exhaust gas probe 70 downstream of the nitrogen oxide storage catalytic converter 60.

According to the inventive lambda gradient method, the rich dynamics phase is used at the start of the NSC regeneration phase. The monitoring time period 112 is illustrated in each case in hatched form in the two signal profile diagrams 100 in FIGS. 2 and 3.

The gradient monitoring starts with a lambda dynamics excitation upstream of the NSC. This means that a lambda profile which can change over time has to be generated in the rich region, i.e. $\lambda < 1$. For example, a simple transition from the lean region into the rich region can be used for this. This can be achieved by corresponding switching over of the engine application. Such switching over into the rich mode takes place, for example, at the start of the NSC regeneration mode.

In this context, a high negative lambda gradient, which can be used as a lambda dynamics excitation for the gradient monitoring, occurs on the input side at the catalytic converter.

As an alternative to evaluating the lean/rich jump at the start of an NSC regeneration it is also possible to use the rich/lean jump at the end of an NSC regeneration. Apart from these passive approaches for using already given lambda rich gradients, there is also the possibility of generating such lambda gradients by means of active measures explicitly for the purpose of monitoring.

FIGS. 2 and 3 show by way of example, in the upper section of the signal profile diagrams 100, a passive lambda dynamics excitation at the start of the NSC regeneration mode.

In the central section of the signal profile diagram 100 in FIGS. 2 and 3, a lambda gradient value 102 is plotted in 1/s on the left-hand ordinate of the diagram, and a squared lambda gradient value 104 is plotted in $(1/s)^2$ on the right-hand ordinate of the diagram. A lambda gradient profile 108 describes the derivative of the lambda profile over time downstream of the NSC 107 in the rich range where $\lambda<1$ for the raw signal (dotted line). A filtered lambda gradient profile 109 shows the time profile for a PT-1 filtered signal of the gradient of the lambda profile downstream of the NSC 107 (unbroken line). Furthermore, the profile of a gradient square 110 is illustrated in the lower part of the central diagram section.

The proposed function makes use of the fact that the NSC reduces the inlet-side lambda rich gradient as a function of its degree of noxiousness. An intact NSC exhibits a lambda value close to $\lambda=1$ on the outlet side owing to its capability of storing oxidizing components such as oxygen and/or nitrogen oxides, through the virtually complete chemical conversion of the reducing exhaust gas components, i.e. the lambda gradient is greatly changed compared to the catalytic converter inlet side. A damaged NSC has, in contrast thereto, a rapid rich gas breakthrough, i.e. the lambda value 101 downstream of the NSC can be significantly below $\lambda=1$, with the result that the lambda gradient value 102 can also assume relatively large values.

In the lower section of the signal profile diagram 100 in FIGS. 2 and 3, a gradient feature value 103 is illustrated as a function of the time 105 with a feature value profile 111 (unbroken line). This value is formed from the integral of the squared and filtered lambda gradient profile 108. The integration runs during the monitoring time period 112, with the result that a final value 113 for the gradient feature value 103 is present at the end of the monitoring time period 112. This final value 113 of the gradient feature value 103 is respectively marked at the end of the monitoring time period 112 with a black dot. This final value is finally compared with a freely definable fault threshold 114. The latter is characterized as a dashed line in the lower section of the respective signal profile diagram 100 in FIGS. 2 and 3. If the value is below the fault threshold 114, the NSC is detected as being "intact", and otherwise the NSC is detected as being "defective". Because of the dependence of the catalytic converter activity on the ambient conditions, such as the catalytic converter temperature and exhaust gas mass flow, it is also appropriate to define the fault threshold 114 for the detection of a defective catalytic converter as a function of these conditions.

Figure 4:
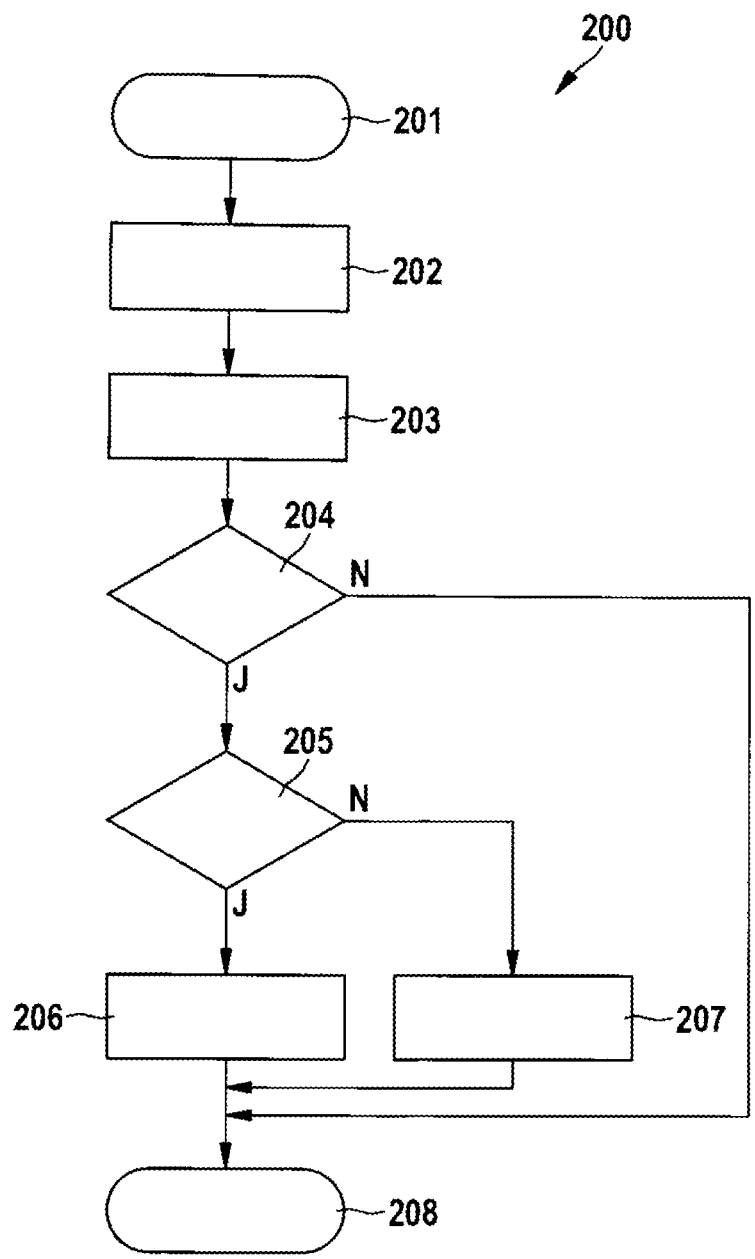
FIG. 4 shows a flowchart of a variant of the monitoring method.

FIG. 4 shows a flowchart 200 of the possible sequence of the NSC monitoring on the basis of the gradient method.

The function starts (start 201) either in a first functional unit 202 with the detection of lambda rich dynamics, for example at the start of the NSC regeneration mode, or with the activation of a suitable engine mode for making available an exciting lambda rich dynamic.

The next step comprises the calculation of the gradient feature value 103 in a second functional unit 203 (see FIGS. 2 and 3). If the result is present, by means of a first interrogation 204 it is checked whether the conditions during the monitoring, for example the thermal state of the NSC, the quality of the lambda rich dynamics, were favorable and therefore whether a robust monitoring result is to be expected. If this is not the case, an abort (end 208) occurs, and otherwise fault checking occurs. In this context, the gradient feature profile 103 is compared with the fault threshold 114 (see FIGS. 2 and 3) by means of a second interrogation 205. If the gradient feature value 113 is below the fault threshold 114, in a third functional unit 206 an "intact NCS" is detected and the method is ended (end 208). If this is not the case, in a fourth functional unit 207 a "defective NSC" is identified and the method is subsequently ended (end 208).

The monitoring phase begins with the start of the lambda rich dynamics, that is to say in the range $\lambda \leq 1$. In the present exemplary embodiment, the lambda signal downstream of the NSC was checked in this regard as a criterion. The end of the monitoring can correspond, for example, to the end of the lambda rich dynamics. The lambda gradient value 102 upstream of the NSC can be used for such a criterion for the end. It is also possible, for example, to use a minimal reducing agent supply, determined from the lambda signal upstream of the NSC, after the attainment of which supply no lambda dynamics are to be expected any more.

What is claimed is:

1. A method for monitoring a nitrogen oxide storage catalytic converter (60) in an exhaust gas duct (30) of an internal combustion engine (1) which is operated at least temporarily in a lean fashion, wherein during a lean mode of the internal combustion engine (1) nitrogen oxides from the exhaust gas are stored by the nitrogen oxide storage catalytic converter (60), wherein during a regeneration phase of the nitrogen oxide storage catalytic converter (60) the internal combustion engine (1) is operated in a rich fashion, and as a result the nitrogen oxides stored in the nitrogen oxide storage catalytic converter (60) are removed, and wherein an exhaust gas component or exhaust gas characteristic variable which is characteristic of a profile of regeneration is detected during the regeneration phase by means of an exhaust gas probe (70), characterized in that, with a change in a chronologically variable lambda profile (106) upstream of the nitrogen oxide storage catalytic converter (60) in the range $\lambda<1$, changes in a lambda gradient profile (108) downstream of the nitrogen oxide storage catalytic converter (60) or variables derived therefrom are evaluated as a feature for monitoring the nitrogen oxide storage catalytic converter (60) and on the basis of these values a diagnosis of the storage capability for nitrogen oxides of the nitrogen oxide storage catalytic converter (60) is carried out.

2. The method according to claim 1, characterized in that the absolute valve of the lambda gradient profile (108) downstream of the nitrogen oxide storage catalytic converter (60) or a squared lambda gradient profile is used for diagnosis.

3. The method according to claim 1, characterized in that the lambda gradient profile (108) downstream of the nitrogen oxide storage catalytic converter (60) is smoothed over time by means of a filter function.

4. The method according to claim 1, characterized in that a gradient feature value (103) is calculated by integrating the squared lambda gradient profile, and a final value (113) of the gradient feature value (103) is compared with a fault threshold (114) at the end of a monitoring time period (112), and a defective or intact nitrogen oxide storage catalytic converter (60) is detected on the basis of the result.

5. The method according to claim 4, characterized in that the fault threshold (114) is applied as a function of ambient conditions for the nitrogen oxide storage catalytic converter (60) and/or operating states of the internal combustion engine (1).

6. The method according to claim 1, characterized in that the diagnosis is started when a lambda rich dynamic is detected or with the activation of a suitable engine mode in order to make available an exciting lambda rich dynamic.

7. The method according to claim 1, characterized in that an excitation-side lambda value (101) or lambda gradient value (102) is determined by means of an exhaust gas probe (50), configured as a lambda probe, upstream of the nitrogen oxide storage catalytic converter (60) in the direction of flow of the exhaust gas, and the lambda gradient profile (108) downstream of the nitrogen oxide storage catalytic converter (60) is standardized.

8. The method according to claim 1, characterized in that the excitation-side lambda value (101) or lambda gradient value (102) is determined on a model basis.

9. The method according to claim 1, characterized in that the monitoring or diagnosis of the nitrogen oxide storage catalytic converter (60) is carried out in a plurality of steps, wherein in a first step the diagnosis is started after the detection of a dynamic lambda excitation, in a second step the gradient feature value (102) is calculated, in a third step it is checked whether certain robustness conditions are met, in a fourth step it is checked whether the gradient feature value (103) undershoots the fault threshold (114), and when these conditions are met an intact nitrogen oxide storage catalytic converter (60) is detected, and when the fault threshold (114) is exceeded a defective nitrogen oxide storage catalytic converter (60) is detected and the diagnostic phase is ended, wherein when the robustness conditions are not met the diagnosis is aborted and repeated at a later time.

10. A device for monitoring a nitrogen oxide storage catalytic converter (60) in an exhaust gas duct (30) of an internal combustion engine (1) which is operated at least temporarily in a lean fashion, wherein during a lean mode of the internal combustion engine (1) nitrogen oxides from the exhaust gas can be stored by the nitrogen oxide storage catalytic converter (60), wherein during a regeneration phase of the nitrogen oxide storage catalytic converter (60) the internal combustion engine (1) is operated in a rich fashion, and as a result the nitrogen oxides stored in the nitrogen oxide storage catalytic converter (60) are removed, and wherein an exhaust gas component or exhaust gas characteristic variable which is characteristic of a profile of regeneration can be detected during the regeneration phase by means of an exhaust gas probe (70) and can be evaluated in a diagnostic unit (81), characterized in that the diagnostic unit has devices for carrying out the monitoring method according to claim 1.

11. The device according to claim 10 wherein the devices for carrying out the monitoring method include at least one of comparators, characteristic diagram memories and calculation units for calculating a gradient feature value (103) from a lambda gradient profile (103) downstream of the nitrogen oxide storage catalytic converter (60).

12. The device according to claim 10, characterized in that the exhaust gas probe (70) is arranged downstream of the nitrogen oxide storage catalytic converter (60) in the exhaust gas duct (30) and is embodied as a lambda probe.

13. The device according to claim 12 wherein a further exhaust gas probe (50), embodied as a lambda probe, is provided upstream of the nitrogen oxide storage catalytic converter (60), the signals of which further exhaust gas probe (50) can be evaluated by the diagnostic unit (81).

* * * * *